Sept. 12, 1950

L. B. HAIGH 2,521,716

TELEGRAPH REPEATER

Filed Dec. 4, 1946

INVENTOR
LESLIE B. HAIGH
BY Robert Harding Jr.
ATTORNEY

Patented Sept. 12, 1950 2,521,716

UNITED STATES PATENT OFFICE 2,521,716

TELEGRAPH REPEATER

Leslie Baines Haigh, London, England, assignor to International Standard Electric Corporation, New York, N. Y.

Application December 4, 1946, Serial No. 714,091
In Great Britain October 11, 1940

Section 1, Public Law 690, August 8, 1946
Patent expires October 11, 1960

5 Claims. (Cl. 178—70)

This invention relates to telegraph repeaters and its main object is to reduce or remove a form of distortion which often affects the first impulse of a train of impulses re-transmitted by a telegraph repeater.

According to the invention, a telegraph repeater for the reception of trains of telegraph signals and for the re-transmission of said signals to a line in the form of current impulses of two kinds, is characterised in this, that in response to the reception of each train of telegraph signals said repeater is arranged to precede the re-transmission of the first signal of the re-transmitted train by the transmission of a current impulse of the other kind.

Also according to the invention, a telegraph repeater for the reception of trains of telegraph signals and for the re-transmission of said signals to a line in the form of current impulses which are alternately in opposite directions of current flow, is characterised in this, that in response to the reception of each train of telegraph signals said repeater is arranged to precede the re-transmission of the first impulse of the re-transmitted train by the transmission of a current impulse in the opposite direction.

Also according to the invention, a telegraph repeater arranged to transmit marking and spacing impulses over a line as substantially equal but opposite currents includes means responsive to a spacing signal forming the first signal of a train to transmit a marking impulse over the line and immediately thereafter to transmit a spacing impulse over the line.

The invention is particularly applicable to the form of telegraph repeater used for repeating trains of impulses transmitted by teleprinters in which each train of impulses represents a character and consists of a start impulse, five code impulses, and a stop impulse. In the commonly used teleprinter code, the start impulse of a train is always a spacing impulse and the stop impulse is always a marking impulse.

In the system of alternate two-way transmission over a single-wire line commonly known as the switched simplex system, the line is nominally subjected at both ends to the same potential when no signals are passing in either direction. A character is transmitted by connecting to one end of the line, potentials alternately positive and negative with respect to the potential at the other end. The start signal, that is, the beginning of the start impulse, is a change at the one end from zero to spacing potential with respect to the potential at the other end, whereas the succeeding code signals are full reversals of potential. It is found in practice, especially on lines having a high time constant, that the impulse-receiving relay at the distant end responds more quickly to the start signal than to succeeding signals with the result that the start impulse is distorted by the relay. In order to overcome this form of distortion, the repeater circuit is modified according to the invention so as to precede the re-transmitted start signal by a mark impulse of short duration.

An embodiment of the invention will now be described by way of example, reference being made to the accompanying drawing comprising Figs. 1 and 2.

Figure 1:
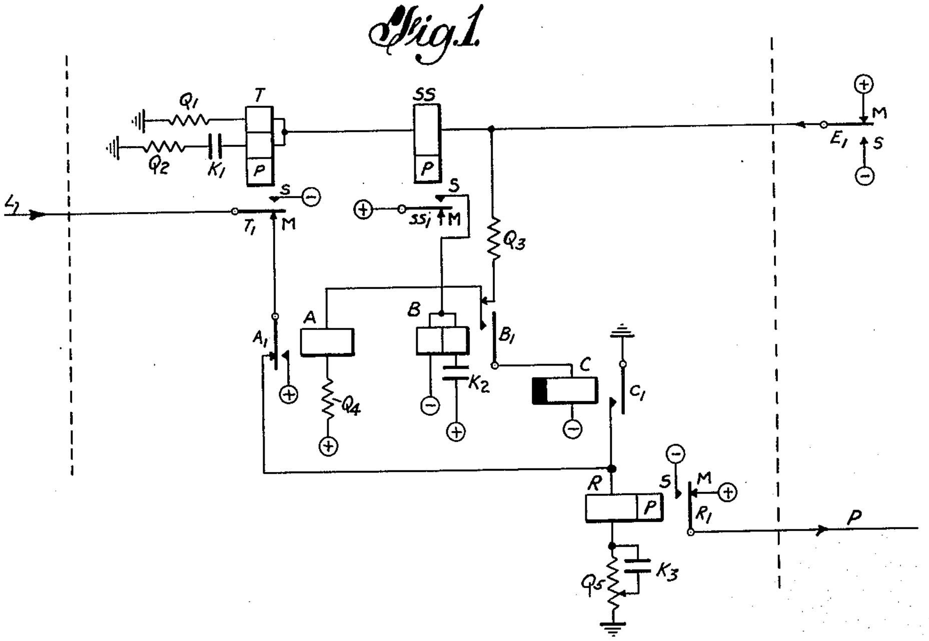
Fig. 1 is a circuit diagram of a telegraph repeater according to the invention.

Fig. 1 shows a telegraph repeater adapted to re-transmit, to a single wire line L, teleprinter signals received from the armature and contacts E1 of a telegraph relay or machine (not shown). The signals received from E1, and also those re-transmitted to line L, are double-current signals, i. e., they consist of reversals from current flowing in one direction to a substantially equal current flowing in the opposite direction. The repeater is adapted also to re-transmit over wire P to a telegraph relay or machine (not shown), signals received from line L. These signals (except the first, as will be explained), and those re-transmitted are also double current signals. In the embodiment being described, both ends of line L are provided with a telegraph repeater according to Fig. 1.

When no signals are passing in either direction, armature E1 is standing on its marking contact M as shown, and current thereover from positive battery through polarised relays SS and T keeps these relays in their marking positions. Line L is connected over T1 marking, A1 back, polarised relay R and resistance Q5, to ground; and armature R1 is standing on its marking contact M (although relay R is nominally receiving no current from line L) and is transmitting to wire P a steady marking potential.

When signals are received by relay R from line L they are re-transmitted by R1 directly to wire P and none of the other relays is affected. Condenser K3 shunting part of resistance Q5 quickens the response, and therefore improves the performance, of R. At the end of transmission, R1 returns to its marking contact M and then the marking potential at the distant end of line L is replaced by ground potential, so that R is deprived of current except for that which may be due to a difference in ground potential between the two ends of the line. R1 is, however, side-stable and remains standing on its marking contact M.

When signals comprising a teleprinter character are received from E1 for re-transmission to line L, the first signal is a spacing signal and E1 reverses to its spacing contact S. E1 closes a circuit for the quick operating relay A: negative battery, E1 spacing, Q3, B1 back, A, Q4, positive battery. A operates and disconnects R from line L. A also connects positive (marking) potential over A1 front and T1 marking to L, thus transmitting a preparatory marking signal to line L. E1 also reverses the direction of current flow through SS, the upper winding of T and resistance Q1 and causes a discharge to flow in a tuned circuit comprising the lower winding of T, condenser K1 and resistance Q2. Armature SS1 reverses to its spacing contact S. The connections of the windings of T are, however, such that the effect on this relay of the discharge through its lower winding opposes that of the current in the upper winding, and armature T1 remains standing momentarily on its marking contact M. After an interval, the effect of the current in the upper winding of T is dominant and T1 reverses to its spacing contact S, disconnecting positive potential from line L and connecting negative (spacing) potential instead, thus transmitting a spacing signal to the line corresponding to the spacing signal received from E1. The circuit constants are so chosen that A operates a short time, for example 5 milliseconds, before T1 reverses.

Thus, the first signal received from E1 is retransmitted with a certain delay by T1, but is preceded by a short preparatory marking impulse, so that at the instant of re-transmission of the signal line L is subjected to a change of potential from positive to negative.

When a second signal, that is, a marking signal, is received from E1, the direction of current flow in SS and the upper winding of T is reversed once more and a discharge again occurs in the lower winding of T. T1 therefore reverses to its marking contact M after a delay which is similar to the above-mentioned delay, since the circuit including T and SS is symmetrical and the positive and negative potentials at E1 are supposed similar. The second signal received from E1 is thereby re-transmitted by T1, line L being subjected to a change of potential from negative to positive.

When SS1 closes its spacing contact S as a consequence of the first signal received from E1, as described, current flows in the upper winding of relay B and, in addition, condenser K2 discharges through the lower winding of this relay. The connections of the windings of B are such that the discharge in the lower winding aids the current in the upper winding and B accordingly operates rapidly. At B1, A is disconnected from negative potential over E1 and is connected instead to negative potential through relay C. C may have a non-inductive winding connected in parallel with its inductive winding to prevent any tendency of A to release at this stage. C operates and at C1 short-circuits R and Q5, for a purpose to be described. Resistance Q3 serves to decouple the circuit, including A, B1 and C, from the circuit including T, SS and E1. The circuit constants are so chosen that B operates and disconnects A from E1 before the latter, under the most unfavourable conditions expected, can reverse again to its marking contact.

Subsequent signals received from E1 are similarly retransmitted by T1, line L being subjected each time to a full reversal of potential. Every time E1 moves to its marking contact, SS1 opens its spacing contact S. Condenser K2 then discharges through both windings of B in series. Although the effects of these windings are now in opposition, the upper winding is dominant and the discharge current is sufficient to hold B operated during any marking impulse occurring in the transmission of a character in the transmission of a character in the teleprinter code. Upon receipt of the marking signal ending each character, E1 moves to its marking contact M, T1 retransmits the signal to line L and SS1 opens the circuit of B. If and when the pause after the reception of the signals comprising a character is long enough, B releases, disconnecting A from negative potential through C and reconnecting it through Q3 to E1, now standing on its marking contact M. A accordingly releases and line L, which at the moment is charged to a certain potential, is connected over T1 marking and A1 back to ground at C1 front, and discharges. B also opens the circuit of C which is, however, slow-releasing and remains operated long enough to ensure the discharge of line L. When C1 opens, line L is again extended through R and Q5 to ground and the circuit is now ready to receive signals from either direction.

Figure 2:
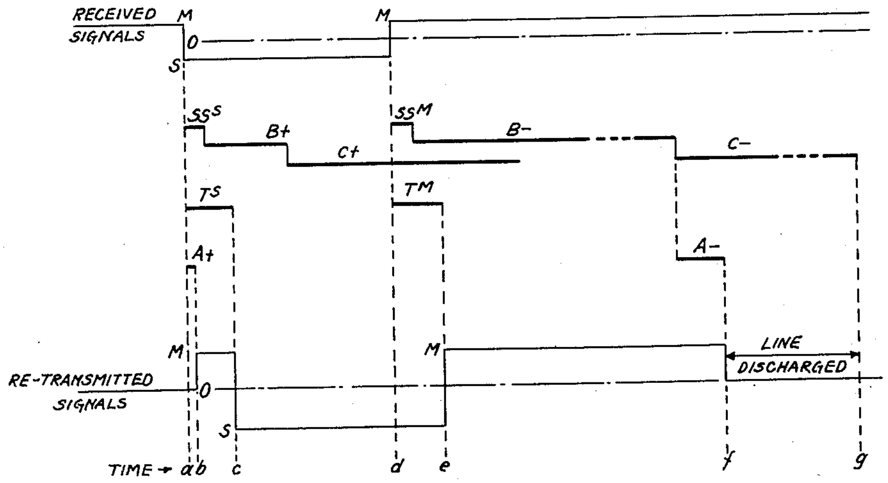
Fig. 2 is an explanatory timing diagram for the circuit of Fig. 1.

Fig. 2 shows diagrammatically the time relations between the signals received from E1 and those transmitted to the line L, for the "letter-shift" combination, taken by way of example, which combination consists in the teleprinter code of a single spacing impulse of 20 milliseconds nominal duration. The thick horizontal lines represent the response times of the designated relays, e. g. A+ represents the operating time of relay A, A— represents the release time of relay A, $T^S$ represents the time taken by relay T to respond to a spacing signal, and $T^M$ represents the time taken by relay T to respond to a marking signal. At a time represented to the left of line *a* the repeater circuit is receiving a steady marking signal from E1 and no signal is being transmitted to line L. At *a*, a spacing signal is received from E1. At *b*, A operates and a marking signal is transmitted to line L. At *c*, T responds to the spacing signal received from E1, and T1 re-transmits a spacing signal to the line. At *d*, nominally 20 milliseconds after *a*, a marking signal is received from E1. In the meantime, SS1 has reversed, B has operated and C is energized (it may have operated). At *e*, nominally 20 milliseconds after *c*, T responds again and T1 re-transmits a marking signal to the line. In the meantime, SS has reversed again and, since no further spacing signal is received, B is de-energized slowly. At *f*, B and A have both released, marking potential is disconnected from line L and the energy stored therein begins to dissipate. At *g*, C releases and R is reconnected to the line.

It will be appreciated, therefore, that, whereas in the system commonly known as the switched simplex system, the start signal is a change from zero to spacing potential, the start signal retransmitted by the telegraph repeater according to the invention is a change from marking potential to spacing potential, that is, a signal of substantially the same quality as those beginning the succeeding code impulses, and that this signal has been preceded by a preparatory marking signal.

When the preparatory marking signal reaches the other end of line L, the armature R1 of the impulse-receiving relay R in the repeater thereat is already standing on its marking contact M, as described. Relay R, therefore, does not respond to this signal. Relay R, however, responds to the succeeding start signal and code signals. Since the start and code signals are of substantially the same quality, relay R responds thereto substantially without introducing distortion.

What is claimed is:

1. A telegraph repeater for the reception of trains of incoming telegraph signals of two different polarities and for retransmission of similar signals to an outgoing line, means connected to respond selectively in synchronism with the incoming signals and their respective polarities to apply similar signals to said outgoing line, means responsive solely to the initial impulse of an incoming train to delay the action of said relay for a predetermined short time interval, and other means also solely responsive to said initial impulse to apply to said outgoing line during said interval an impulse having a polarity which is opposite to that of said initial impulse.

2. A telegraph repeater for the reception of trains of incoming telegraph signals of two different polarities and for retransmission of similar signals to an outgoing line, a first relay connected to respond selectively in synchronism with the incoming signals and their respective polarities to apply similar signals to said outgoing line, means associated with said first relay to delay its response for a predetermined time interval solely after the receipt of an initial incoming impulse, and a second relay also solely responsive to said initial impulse to apply to said outgoing line during said interval an impulse having a polarity which is opposite to that of said initial impulse.

3. A telegraph repeater according to claim 2, in which a slow-to-release relay is also provided which is operated solely in response to said initial impulse, said slow-to-release relay when operated breaking the operating circuit of said second relay.

4. A telegraph repeater for the reception of trains of incoming telegraph mark and space signals of equal but opposite polarity currents and for retransmitting similar opposite polarity mark and space signals to an outgoing line, relay means solely responsive to a spacing signal which forms the first signal unit of an incoming train to transmit to said outgoing line a momentary marking signal for a predetermined time interval, and other relay means effective after said interval and selectively responsive to an incoming train to apply a similar train to said outgoing line.

5. A telegraph repeater for the reception of trains of incoming telegraph mark and space signals of different polarities and for retransmission of similar mark and space signals to an outgoing line, a pair of polarized relays to which the incoming signals are simultaneously applied, one of said relays having means to delay its response solely to the initial impulse of an incoming train, a first fast-acting relay controlled by the said second polarized relay, another fast-acting relay controlled solely by the initial impulse on an incoming train, a slow-to-release relay controlled by said first-mentioned fast-acting relay and operating substantially simultaneously therewith, and means controlled by the second-mentioned fast-acting relay to apply to said outgoing line solely in response to the initial impulse of an incoming train, an impulse of a polarity which is opposite to that of said initial impulse.

LESLIE BAINES HAIGH.

REFERENCES CITED

The following references are of record in the file of this patent:

UNITED STATES PATENTS

| Number | Name | Date |
|---|---|---|
| 1,146,234 | Bruce | July 13, 1915 |
| 1,386,679 | Bell | Aug. 9, 1921 |
| 2,230,681 | Frischknecht | Feb. 4, 1941 |
| 2,415,420 | Dahlbom | Feb. 11, 1947 |